Sept. 27, 1960 J. F. CHANDLER 2,954,500

TELEVISION RECEIVER

Filed Oct. 1, 1957 2 Sheets-Sheet 1

Inventor
James F. Chandler
By John J. Pederson
Attorney

Inventor
James F. Chandler
By John J. Pederson
Attorney

United States Patent Office 2,954,500

Patented Sept. 27, 1960

2,954,500

TELEVISION RECEIVER

James F. Chandler, Chicago, Ill., assignor to Zenith Radio Corporation, a corporation of Delaware Filed Oct. 1, 1957, Ser. No. 687,507

8 Claims. (Cl. 315—22)

This invention relates to a new and improved television receiver. More specifically, the invention relates to a television receiver in which changes in focus with variations in picture brightness are effectively and automatically compensated as an incident to operation of the receiver. The invention is of particular utility in a color television receiver and is therefore described in that environment.

In color television receivers, it has been customary to utilize a voltage regulator in the high-voltage power supply for the image reproducer in order to maintain a substantially constant final anode potential in the picture tube. Such voltage regulators, whether of the vacuum tube or corona-discharge type, are relatively expensive and consequently add materially to the cost of the receiver. Accordingly, it is highly desirable from an economic standpoint to omit the voltage regulator, particularly since the cost of color television receivers is a major factor tending to prevent general acceptance of color television. Omission of the voltage regulator in the high-voltage supply of the receiver, on the other hand, introduces several highly undesirable effects in operation of the receiver which have heretofore made it impractical to employ an unregulated high-voltage supply in such receivers. For example, the use of an unregulated high-voltage power supply in a conventional color receiver may cause substantial distortion in color values, particularly on monochrome reproduction, and may further lead to substantial variations in focus of the electron beams in the color image reproducer with changes in the total beam current in the picture tube caused by changes in picture brightness. The present invention is primarily concerned with the latter effect, that of changes in electron beam focus with variations in image brightness.

Presently available color image reproducers require a relatively high positive-polarity operating potential on the focus electrodes of the individual electron guns incorporated therein; for example, the focus electrode operating potential may be of the order of 4–5 kilivolts. Consequently, it is usually necessary to provide a separate power supply for the focus electrodes of the image reproducer. This focus voltage power supply may comprise a rectifier coupled to the horizontal sweep transformer of the receiver in known manner to generate a relatively high D.C. potential by rectification of the flyback pulses developed in the sweep transformer. With conventional regulated circuits, the focus voltage developed by a power supply of this type remains substantially constant regardless of variations in beam current and picture brightness. In a receiver in which the power supply for the anode is unregulated, however, the final anode potential may change substantially with changes in picture brightness. Consequently, the voltage ratio between the anode and focus electrodes may change substantially, depending upon the brightness of the reproduced image, with the result that the focus of the electron beams changes considerably. Under these circumstances, the image is not reproduced in the clear, consistent manner requisite to satisfactory operation of the receiver.

A primary object of the invention, therefore, is to provide a new and improved television receiver in which definition and sharpness of the reproduced image is made substantially independent of changes in picture brightness.

A more specific object of the invention is to provide a new and improved television receiver, and particularly a color television receiver, which maintains substantially constant focus in the image reproducer despite substantial variations in final anode potential with changes in picture brightness.

A corollary object of the invention is to provide a new and improved color television receiver which affords a substantial reduction in cost, as compared with conventional receivers, without entailing a corresponding sacrifice in picture definition.

A television receiver constructed in accordance with the invention comprises an image reproducer including an image target and an electron gun for projecting a stream of electrons to impinge upon that target; the electron gun comprises the usual cathode and other electrodes including a focus electrode and anode. The television receiver further comprises a sweep transformer and a high-voltage power supply which exhibits substantial variations in operating potential with changes in picture brightness; this power supply includes a rectifier coupled to the sweep transformer and connected to the image reproducer anode. The focus voltage power supply of the receiver comprises a second rectifier coupled to the sweep transformer and connected to the focus electrode of the image reproducer. The television receiver further includes means for maintaining a substantially constant focus in the image reproducer; this means comprises an impedance connected in series with the sweep transformer winding to constitute a load impedance common to the high voltage and focus voltage rectifiers to vary the focus potential with changes in picture brightness, thus maintaining a substantially constant anode-to-focus voltage ratio. As applied to a color television receiver, in which the invention is most advantageous, the invention includes a focus voltage power supply of the kind set forth hereinabove connected to the focus electrode or electrodes of the electron gun or guns included in a color image reproducer.

Other and further objects of the present invention will be apparent from the following description and claims and are illustrated in the accompanying drawing which, by way of illustration, shows preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention.

Figure 1:
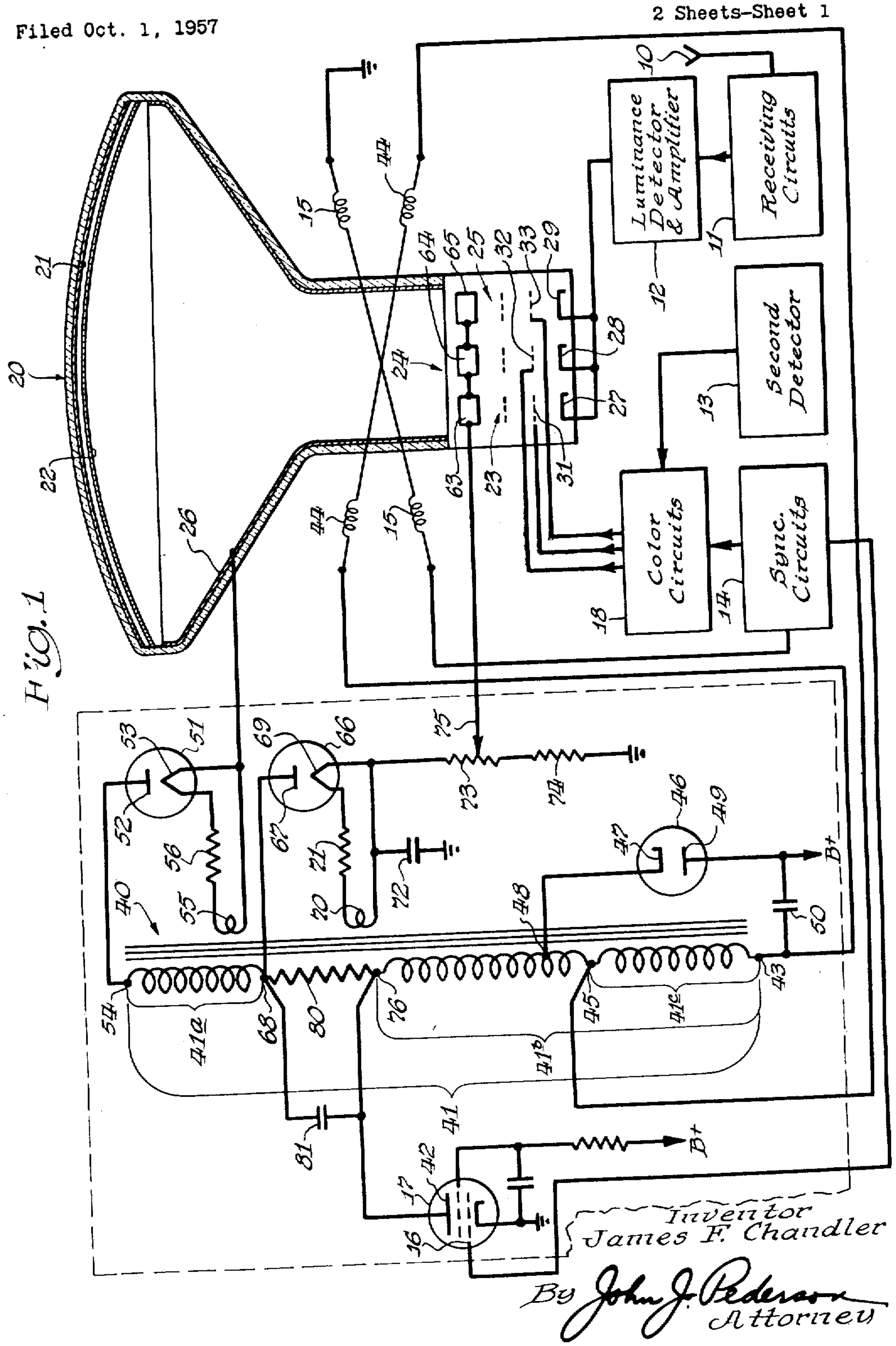
Figure 1 is a simplified schematic diagram of a color television receiver constructed in accordance with one embodiment of the invention and showing the anode and focus power supplies of the receiver in detail.

The color television receiver illustrated in Figure 1 comprises an antenna 10 coupled to a receiving circuit unit 11; receiving circuits 11 may include the usual radio-frequency amplifier, a first detector, and an intermediate-frequency amplifier. The output of receiving circuit unit 11 is coupled to a luminance detector and amplifier 12 and to a second detector 13. Second detector 13 is coupled to suitable synchronizing circuits 14, including the usual vertical-frequency scanning signal generating circuits which are coupled to a vertical deflection yoke comprising the deflection coils 15. The synchronizing circuits 14 further include the usual horizontal-frequency oscillator and discharge device coupled to the control electrode 16 of a horizontal output tube 17 in known manner. Synchronizing circuit unit 14 may further include suitable circuits for segregating the color synchronizing signal from the received telecast; this signal is applied to the color circuits 18 of the receiver, which may include a color-reference signal generator and a suitable color demodulating system. The carrier color signal components of the received telecast may also be applied to color circuits 18 from second detector 13.

The color television receiver of Figure 1 further includes an image reproducer 20 illustrated as a conventional shadow mask color picture tube. Image reproducer 20 includes a tricolor image target 21, a parallax mask 22, three electron guns 23, 24, and 25, and a final anode 26 interposed between the three electron guns and the image target of the tube. The cathodes 27, 28, and 29 of electron guns 23, 24, and 25 respectively are all coupled to luminance circuit 12. The control electrodes 31, 32, 33 of the three electron guns are separately coupled to the color demodulating system of circuit 18. Thus, the particular television receiver illustrated in Figure 1 provides for color matrixing in the picture tube, a luminance signal being applied to the cathodes of the three electron guns and color difference signals being supplied to the control electrodes. Normally appropriate means are provided for insuring both static and dynamic convergence of the three electron beams in the plane of the image target; the convergence means are not illustrated since numerous suitable arrangements for achieving this objective are known in the art, and the convergence problem is not related to the present invention in any way. It should be understood that the present invention is by no means restricted to an arrangement of this kind; rather, it is applicable to color television receivers in which matrixing is completed externally of the color image reproducer and also to monochrome television receivers.

The color television receiver of Figure 1 further includes a horizontal-frequency sweep transformer 40 which, in accordance with current commercial practice, is constructed as an autotransformer. Sweep transformer 40 includes a primary winding 41*b*, the portion of winding 41 between tap 76 and terminal 43, which is connected to the anode 42 of horizontal output tube 17. The secondary winding 41*c*, the portion of winding 41 between tap 45 and terminal 43, is coupled to a horizontal deflection yoke associated with image reproducer 20 and indicated by a pair of deflection coils 44 connected in series with each other. The usual damper tube 46 is included in the sweep transformer circuit, the cathode 47 of the damper being connected to a terminal 48 on the transformer winding and the anode 49 of the damper being returned to the low-voltage or B+ supply of the receiver. A by-pass capacitor 50 is coupled between anode 49 and terminal 43 of the transformer winding.

The high-voltage power supply of the receiver comprises a rectifier 51 having an anode 52 and a filament or cathode 53. Anode 52 is connected to the end terminal 54 of winding 41 opposite terminal 43. Cathode 53 of the high-voltage rectifier is coupled to the transformer by means of a winding 55 connected in series with a resistor 56 in conventional manner; cathode 53 is also connected to final anode 26 of the color picture tube. It should be noted that there is no voltage regulator associated with the high-voltage power supply comprising rectifier 51. Consequently, the operating potential developed by the rectifier varies substantially with changes in the total beam current collected by picture tube anode 26. Stated differently, the final anode voltage in the receiver illustrated in Figure 1 exhibits substantial variations with changes in picture brightness.

The color receiver of Figure 1 further includes a separate focus voltage power supply for the three focus electrodes 63, 64, and 65 of electron guns 23, 24, and 25 respectively. In some respects, this focus voltage power supply is of conventional construction; it comprises a rectifier 66 having an anode 67 connected to an intermediate terminal 68 on the autotransformer winding 41. The filament 69 of the focus voltage rectifier is coupled to the sweep transformer by means of a coil 70 connected in series with a suitable resistor 71 in known manner. A focus-potential adjusting circuit is provided in the receiver and comprises a potentiometer 73 connected in series with a resistor 74 between filament 69 and a plane of reference potential, here shown as ground. A filter capacitor 72 is connected in parallel with the output circuit 73, 74. The variable tap 75 on the potentiometer is connected to focus electrodes 63—65 and affords a means for adjusting the operating potential on the focus electrodes.

In a television receiver constructed in accordance with conventional practice, the focus voltage rectifier anode 67 is normally returned to the transformer winding terminal 76 to which horizontal output tube anode 42 is connected. Alternatively, and also in accordance with conventional practice, anode 67 might be connected to some other point on the winding intermediate terminals 43 and 54. The winding is not normally interrupted between terminals 68 and 76. In a color television receiver with a focus-voltage rectifier of otherwise conventional construction but in which the high-voltage supply is unregulated, the focus voltage varies to some extent with changes in picture brightness, since the focus-voltage rectifier is directly coupled to the transformer and thus is affected by changes in the amplitude of the high-voltage pulses. However, the high-voltage tertiary winding 41*a*, the portion or segment of transformer winding 41 between terminals 54 and 68, is not as tightly coupled to the primary winding 41*b* as the focus portion; consequently, the operating potential developed by high-voltage rectifier 51 decreases more rapidly than the operating potential developed by focus-voltage rectifier 66 in response to increases in beam current within picture tube 20.

Although this operating characteristic is of little importance in television receivers having a regulated high-voltage supply, it produces highly undesirable focus effects in a receiver, such as that of Figure 1, in which the final anode voltage changes substantially with variations in picture brightness. Thus, when the final anode voltage drops substantially as the result of an increase in picture brightness and a consequent increase in total beam current in picture tube 20, the voltage ratio between focus electrodes 63—65 and final anode 26 changes appreciably. An example of typical operating values is as follows:

*Table I*

| Beam Current | Anode Potential, kilovolts | Focus Potential, kilovolts | Focus-to-Anode Ratio |
|---|---|---|---|
| Zero | 25 | 5 | 0.2 |
| 800 Microamperes | 20 | 4.5 | 0.225 |

Under these circumstances, the focus-to-anode voltage ratio varies by more than ten percent, with the result that each of the three electron beams developed in the image reproducer is substantially de-focused. The picture developed by tube 20 becomes fuzzy and indistince and a considerable portion of the picture detail is lost. Thus, in a conventional receiver modified to include an unregulated high-voltage power supply, the relatively constant focus required for clear and accurate image reproduction is not maintained.

The receiver of Figure 1, however, is provided with means for maintaining a substantially constant focus for the electron beams developed by guns 23—25 of image reproducer 20. This means comprises a load resistor 80 connected in series with transformer winding 41 as a load impedance common to high-voltage rectifier 51 and focus voltage rectifier 66. In the preferred embodiment of Figure 1, the load resistor is connected between terminals 68 and 76 of the transformer winding. In addition, a by-pass capacitor 81 is connected in shunt with load impedance 80. The variable D.C. current developed in the transformer winding by high-voltage rectifier 51 flows through load resistor 80 and modifies the focus potential developed by the focus voltage power supply comprising rectifier 66. By way of example, by adding resistor 80 of appropriate magnitude to provide a 600-volt drop, the operating conditions of Table I are altered as follows:

*Table II*

| Beam Current | Anode Potential, kilovolts | Focus Potential, kilovolts | Focus-to-Anode Ratio |
|---|---|---|---|
| Zero | 25 | 5 | 0.2 |
| 800 Microamperes | 19.4 | 3.9 | 0.2 |

Consequently, with the load resistor connected in the illustrated manner, the operating potential developed by the focus voltage power supply of the receiver changes in amplitude with changes in picture brightness in essentially the same proportion as the anode voltage and it is thus possible to maintain a substantially constant anode-to-focus voltage ratio in the receiver regardless of changes in picture brightness.

By-pass capacitor 81 is not essential to the basic operation of the invention, but is of substantial value in reducing the power loss occasioned by incorporation of the load resistor in the sweep transformer circuit. If the by-pass capacitor is omitted, the pulse current driving the high voltage rectifier flows through the load impedance and produces the desired drop in focus potential. This A.C. drop is very much greater than the D.C. potential induced in the by-passed load resistor 80; consequently, it is necessary to reduce the load impedance very substantially. At the same time, it is necessary to employ a load impedance of substantially higher power rating; typical values are set forth hereinafter. The reduction in power loss accomplished by use of the by-pass capacitor 81 may be of the order of 3:1 or greater as compared with the use of a load resistor which is not by-passed.

Generally speaking, it is desirable to observe certain conditions in incorporating focus voltage load resistor 80 rectifier 66. By way of example, by adding resistor 80 into the sweep transformer. Thus, it would not be useful or practical to continue winding 41 beyond terminal 54 and connect the focus voltage power supply and load resistor in the winding extension, since this would defeat the purpose of the invention by precluding application of the variable A.C. or D.C. current from the high-voltage power supply to the focus voltage load resistor. Further, it is necessary to keep the D.C. current drawn by horizontal output tube 17 out of the focus voltage load resistor in order to permit effective operation of the deflection circuitry. Consequently, the load resistor should be connected in series with the transformer primary and tertiary windings at a point intermediate the connections to the focus voltage rectifier and the horizontal output tube.

Figure 2:
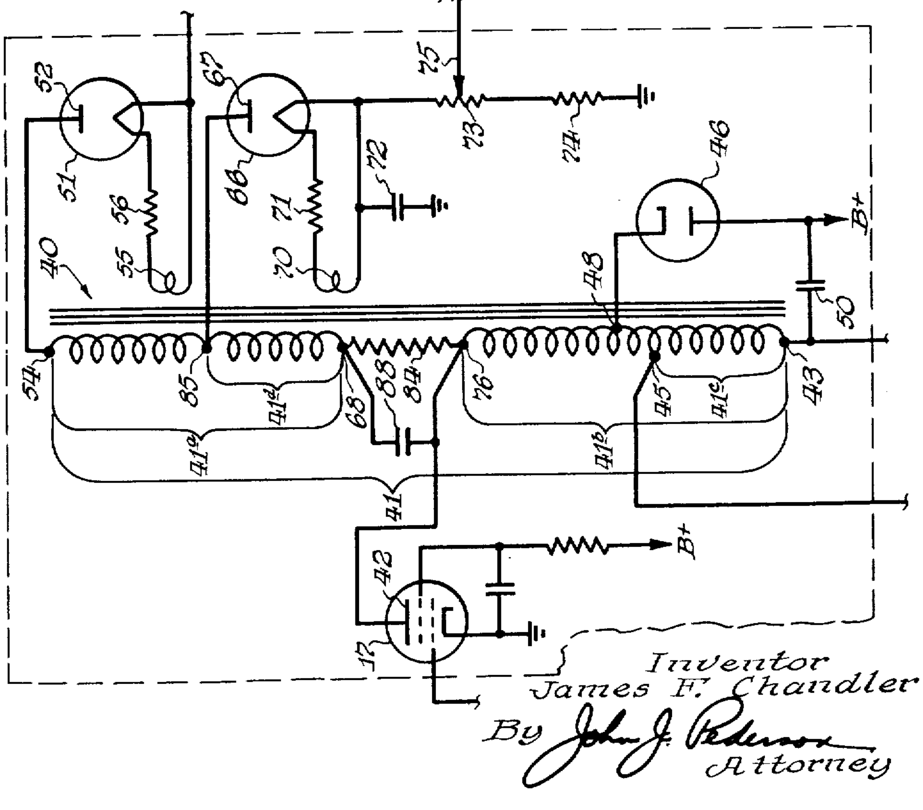
Figure 2 is a schematic diagram of another embodiment of anode and focus electrode power supplies which may be utilized to carry out the inventive concept.

Figure 2 illustrates a modified arrangement which is essentially similar, in operational characteristics, to the embodiment of Figure 1; this modification is applicable to circuits in which the driving pulses for the focus voltage rectifier are required to be of greater amplitude than those developed at transformer terminal 76. In this embodiment, high-voltage rectifier 51 again has its anode 52 connected to terminal 54 at one end of winding 41 of sweep transformer 40. Focus voltage rectifier 66 is coupled to the sweep transformer in a somewhat different manner, with anode 67 connected to a tap 85 which is separated from terminal 68 by a segment **41*d* of winding 41 on tertiary winding 41*a*. The connection for horizontal output tube 17 remains substantially unchanged, the anode 42 thereof being connected to terminal 76** of the sweep transformer winding.

In this embodiment, as in the first-described circuit, a load resistor is connected in series with sweep transformer primary and tertiary windings **41*b* and 41*a* to afford a means for varying the focus voltage of the receiver in accordance with changes in picture brightness and in proportion to changes in final anode voltage. As in the first embodiment, a by-pass capacitor 88** is preferably provided for the load resistor.

Operationally, the embodiment of Figure 2 is essentially the same as that of Figure 1. The variable D.C. current in tertiary winding **41*a* from high-voltage rectifier 51 flows through the load resistor 84** and causes the operating potential developed by the focus voltage rectifier to vary in proportion to the variations in final anode voltage. Consequently, the circuit arrangement of Figure 2 may be utilized to maintain a substantially constant anode-to-focus voltage ratio in a receiver having an unregulated high-voltage supply despite the fact that the final anode voltage in the receiver changes as a result of variations in picture brightness.

Figure 3:
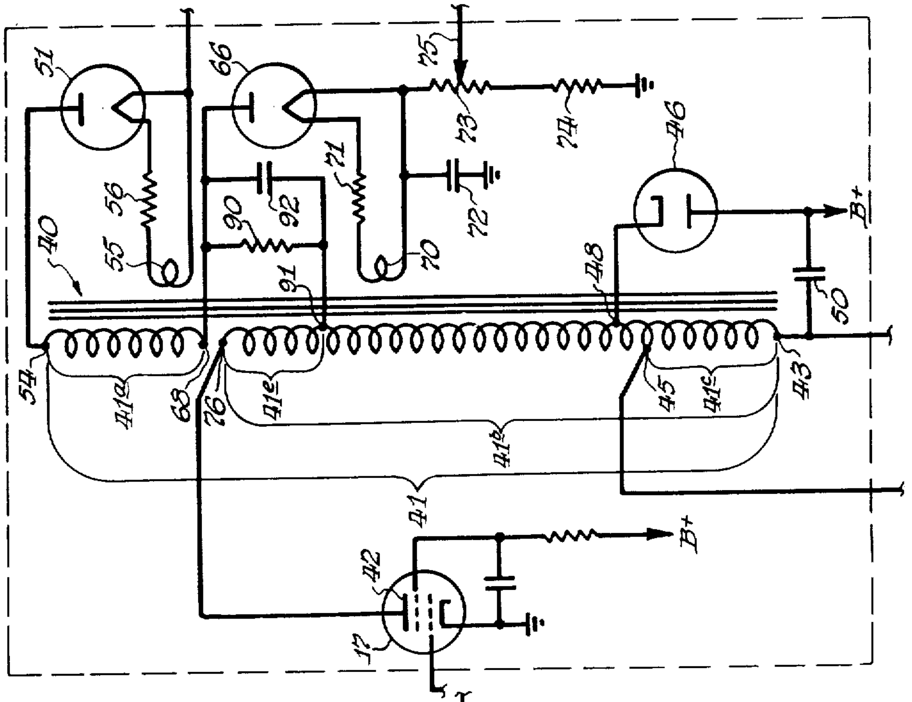
Figure 3 is a schematic diagram of a further embodiment of the invention.

A further embodiment of the invention is illustrated in Figure 3; this modification is applicable to circuits in which the driving pulses for the focus voltage rectifier are required to be of substantially smaller amplitude than those developed at transformer terminal 76 in the embodiment of Figure 1. In this embodiment of the invention, anode voltage rectifier 51 is connected to tertiary winding **41*a* as before and focus voltage rectifier 66 is connected to the low-potential terminal 68 of the tertiary winding. In this embodiment, moreover, the horizontal output tube 17 is again connected to sweep transformer terminal 76**.

In the modified circuit of Figure 3, however, there is no load impedance directly interconnecting sweep transformer terminals 68 and 76. Rather, a load resistor 90 is connected between transformer terminal 68 and a tap 91 on the transformer primary winding **41*b* which is separated from terminal 76 by a winding segment 41*e*. Thus, the load impedance is again connected in series with the main transformer winding and comprises a load impedance common to both the final anode voltage and focus voltage rectifiers. As in the embodiments of Figures 1 and 2, a by-pass capacitor 92 is preferably connected in shunt with the load impedance 90**.

Operationally, the embodiment of Figure 3 is essentially similar to that of Figures 1 and 2. The variable D.C. current in transformer tertiary winding **41*a* from high-voltage rectifier 51 flows through load impedance 90 and effectively causes the operating potential developed by focus voltage rectifier 66** to change in proportion to variations in final anode voltage. Accordingly, the embodiment of figure 3 affords a substantially constant focus-to-anode voltage ratio in a receiver including an unregulated high-voltage power supply.

In each of the above-described embodiments, the load impedance common to the final anode voltage and focus voltage rectifiers has been described and illustrated as a resistance, and a resistance load is preferred for simplicity and economy. It should be understood, however, that the load impedance need not necessarily be constituted by a resistor; rather, a suitable inductance or a damped tuned circuit may be utilized as the load impedance of the inventive circuit.

In order to afford a more complete and detailed illustration of the invention, certain data relating to individual circuit components and operating conditions in the embodiment of Figure 1 are set forth hereinafter. It is to be understood that this material is included solely by way of illustration and in no sense as a limitation on the scope of the invention.

| | |
|---|---|
| Final anode potential range | 20–25 kv. |
| Focus potential range | 4–5 kv. |
| Tube 17 | 6CD6GA. |

| | |
|---|---|
| Rectifier **51** | 3A3. |
| Rectifier **66** | 1V2. |
| Resistor **56** | 4.7 ohms. |
| Resistor **71** | 4.7 ohms. |
| Potentiometer **75** | 5 megohms. |
| Resistor **74** | 20 megohms. |
| Resistor **80** | 680 kilohms, 2 watts. |
| Capacitor **81** | 0.0022 microfarad. |
| Capacitor **72** | 100 micromicrofarads. |

As indicated hereinabove, the use of an unbypassed resistor as the load impedance common to the two rectifiers necessitates a substantial change in the load impedance. In the circuit of Figure 1, utilizing the components itemized in detail immediately hereinabove, omission of the by-pass capacitor 81 necessitates a reduction in the impedance of load resistor 80 to approximately 10 kilohms. This resistor must afford a substantially greater heat-dissipation capacity, however; a rating of 10 watts is recommended.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A television receiver comprising: an image reproducer comprising an image target and an electron gun for projecting an electron beam to impinge on said target and including a cathode, a focus electrode, and an anode; a sweep transformer comprising a primary winding a secondary winding, and a high voltage tertiary winding; means coupled to said secondary winding and responsive to an applied sweep signal for deflecting said electron beam across said image target; means for impressing a sweep signal across said primary winding to actuate said deflecting means, whereby flyback pulses are developed across said primary and tertiary windings; a high-voltage power supply including a high-voltage rectifier coupled to said tertiary winding for rectifying the flyback pulses developed thereacross to provide a unidirectional operating voltage for said anode of said image reproducer, said operating voltage fluctuating with changes in the intensity of said electron beam; an auxiliary power supply including an additional rectifier coupled to one of said windings for rectifying the flyback pulses developed thereacross to provide a lower unidirectional operating voltage for said focus electrode, said lower operating voltage fluctuating with changes in intensity of said electron beam at a different rate than said anode operating voltage fluctuations; and means including a common load impedance for said rectifiers with said impedance having a value maintaining the ratio between said operating voltages substantially constant and independent of said changes in intensity of said electron beam.

2. A television receiver according to claim 1, in which said common load impedance is a resistor.

3. A television receiver according to claim 1, in which a by-pass capacitor is connected in parallel with said common load impedance.

4. A television receiver according to claim 1, in which said common load impedance is connected in series with at least a portion of each of said primary and tertiary windings.

5. A television receiver according to claim 1, in which said common load impedance is series-connected between said primary and tertiary windings.

6. A color television receiver comprising: an image reproducer for generating images in simulated natural color comprising an image target and means including at least one electron gun for projecting a plurality of electron beam components to impinge on said target and further including cathode, focus electrode, and anode elements; a sweep transformer of the autotransformer type comprising a primary winding, a secondary winding, and a high-voltage tertiary winding each constituting a different tapped portion of a single series inductance; means coupled to said secondary winding and responsive to an applied sweep signal for deflecting said electron beam components across said image target; means for impressing a sweep signal across said primary winding to actuate said deflecting means, whereby flyback pulses are developed across said primary and tertiary windings; an unregulated high-voltage power supply including a high-voltage rectifier coupled to said tertiary winding for rectifying the flyback pulses developed thereacross to provide a unidirectional operating voltage for said anode of said image reproducer, said operating voltage fluctuating with changes in the intensity of said electron beam components; an auxiliary unregulated power supply including an additional rectifier coupled to said primary winding for rectifiying the flyback pulses developed thereacross to provide a lower unidirectional operating voltage for said focus electrode, said lower operating voltage fluctuating with changes in intensity of said electron beam components at a different rate than said anode operating voltage fluctuations; means including a common load impedance for said rectifiers in the form of a resistor series-connected between said primary and tertiary windings and having a value maintaining the ratio between said operating voltages substantially constant and independent of said changes in intensity of said electron beam components; and a by-pass capacitor connected in parallel with said resistor.

7. A television receiver comprising: an image reproducer comprising an image target and an electron gun for projecting a stream of electrons to impinge upon said target and including a cathode, a focus electrode, and an anode; a sweep transformer; a high-voltage power supply, comprising a first rectifier coupled to said sweep transformer and connected to said image reproducer anode, exhibiting substantial variations in operating potential with changes in picture brightness; a focus voltage power supply, comprising a second rectifier coupled to said sweep transformer and connected to said image reproducer focus electrode; and means for maintaining a substantially constant focus in said image reproducer, said means comprising an impedance connected in series with said sweep transformer as a load impedance common to said first and second rectifiers to vary the focus potential with changes in picture brightness and having a value maintaining a substantially constant anode-to-focus voltage ratio.

8. A television receiver comprising: an image reproducer comprising an image target and an electron gun for projecting a stream of electrons to impinge upon said target and including a cathode, a focus electrode, and an anode; a sweep autotransformer having a two-segment winding; a high-voltage power supply, comprising a first rectifier having an anode connected to one end of a first segment of the transformer winding and a cathode coupled to said sweep transformer and connected to said image reproducer anode, exhibiting substantial variations in operating potential with changes in picture brightness; a horizontal discharge device connected to the other segment of said winding; a focus voltage power supply, comprising a second rectifier having an anode connected to the first segment of said winding and a cathode coupled to said sweep transformer and connected to said image reproducer focus electrode; and means for maintaining a substantially constant focus in said image reproducer, said means comprising a resistor connected between the two segments of said sweep transformer winding as a load impedance common to said first and second rectifiers to vary the focus potential with changes in picture brightness and having a value maintaining a substantially constant anode-to-focus voltage ratio; and a by-pass capacitor connected in parallel with said load resistor.

References Cited in the file of this patent

UNITED STATES PATENTS

| | | |
|---|---|---|
| 2,599,798 | Wissel | June 10, 1952 |
| 2,601,153 | Knight | June 17, 1952 |
| 2,628,326 | Bridges | Feb. 10, 1953 |
| 2,726,340 | Nelson | Dec. 6, 1955 |
| 2,729,764 | Dietch | Jan. 3, 1956 |
| 2,813,225 | Dietch | Nov. 12, 1957 |
| 2,822,503 | Campbell | Feb. 4, 1958 |

OTHER REFERENCES

Rider's Television Manual, vol. 1, copyrighted 1948; GE TV, pages 1–81, 82; Models 901, 910.

Rider's Television Manual, vol. 10, copyrighted 1952; RCA TV, pages 10–34; RCA Chassis KCS 66.

Rider's Television Manual, vol. 5, copyrighted 1950; GE TV, pages 5–20, Model 12K1.

Admiral Service Manual No. S592, Chassis 29Z1; received in Scientific Library February 21, 1957; page 68.